Dec. 16, 1958
C. J. SMITH
2,864,933
APPARATUS FOR PRODUCING CAN BODIES AND WELDING SIDE SEAMS THEREOF
Filed Feb. 19, 1957
6 Sheets-Sheet 4
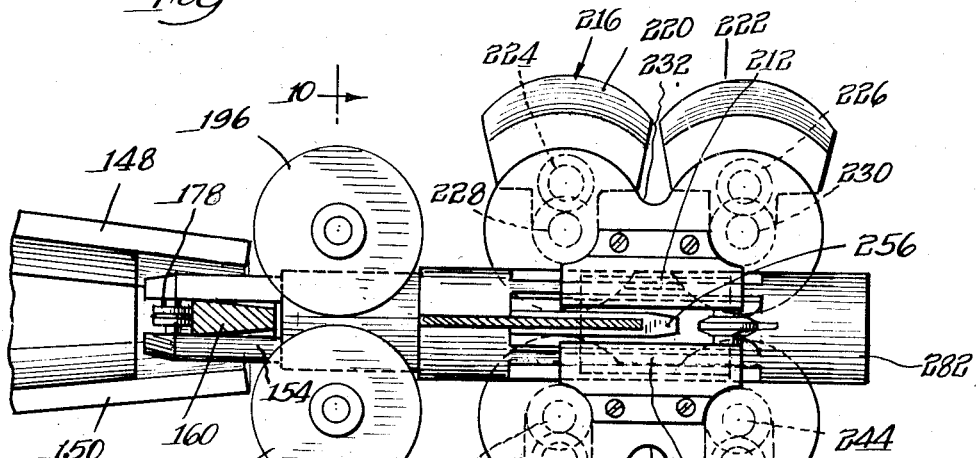
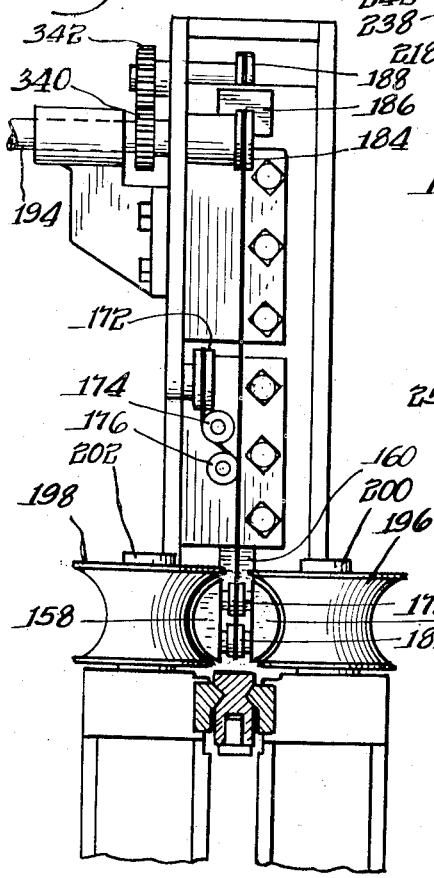
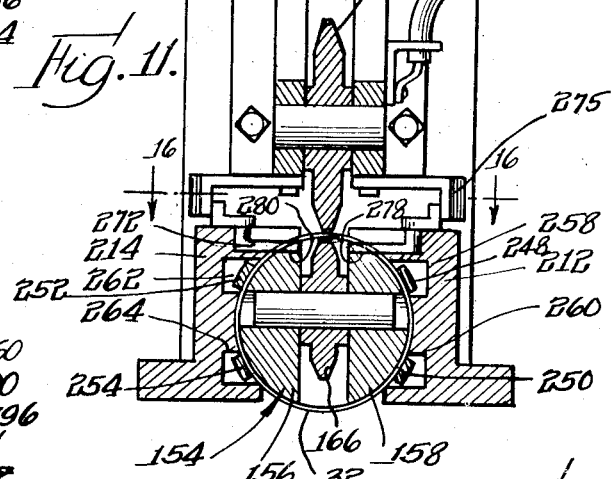
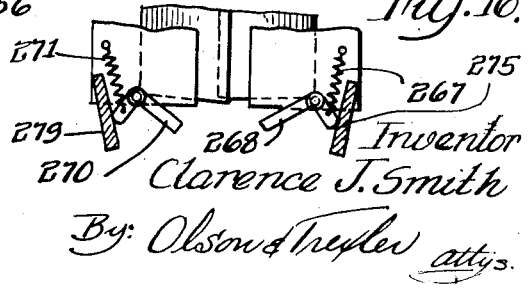
Inventor
Clarence J. Smith
By: Olson & Trexler attys Inventor
Clarence J. Smith
By: Olson & Trexler
attys.

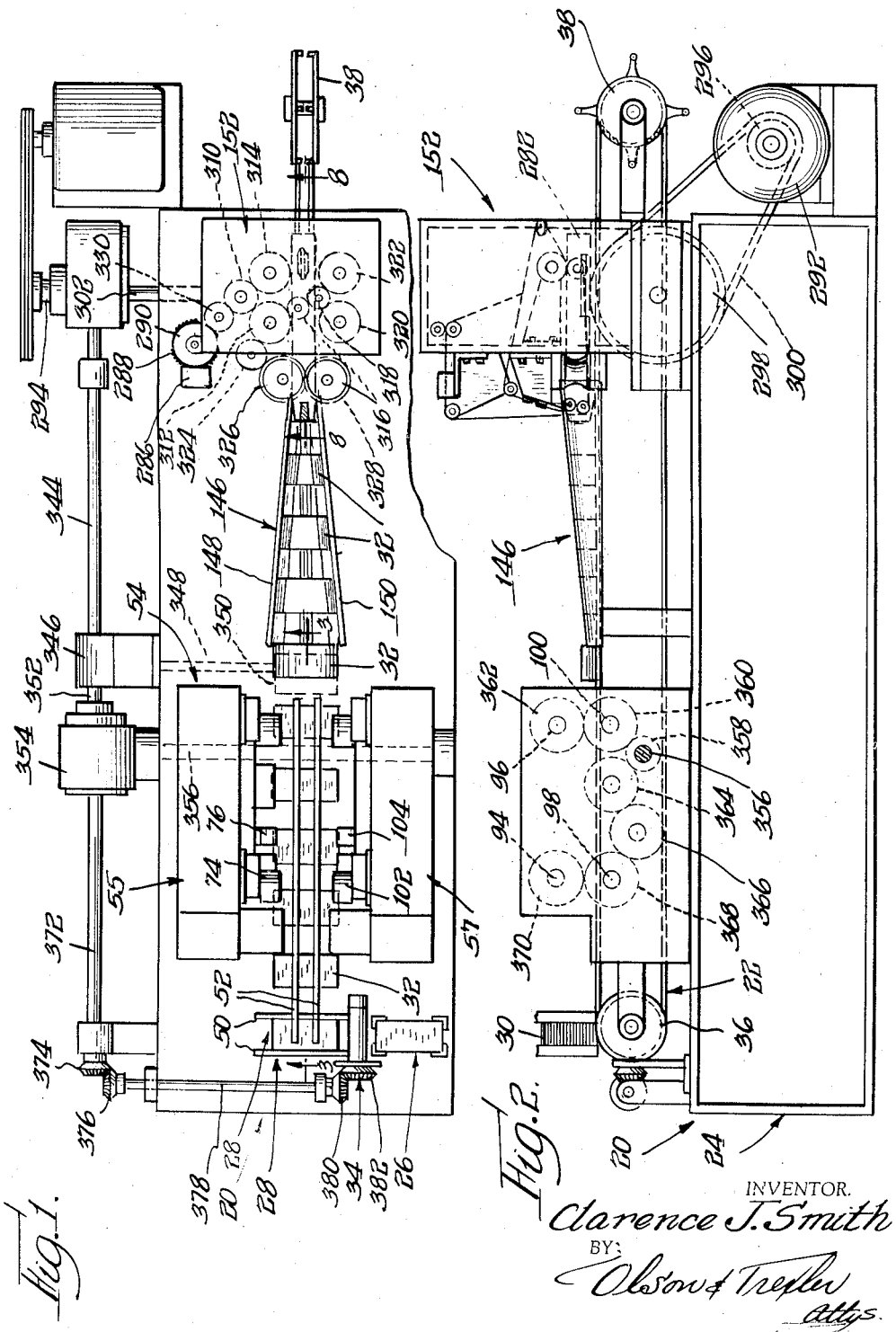

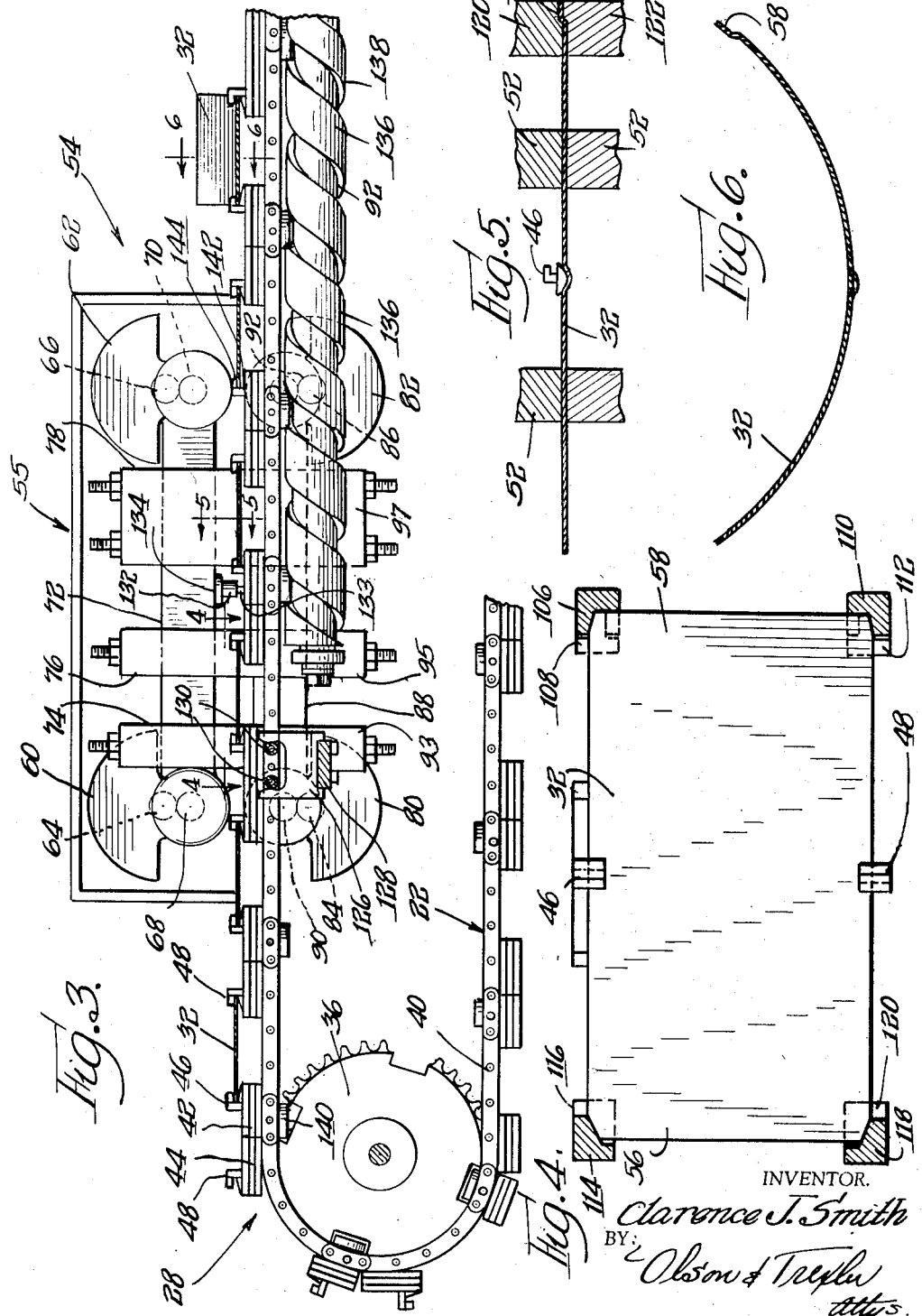

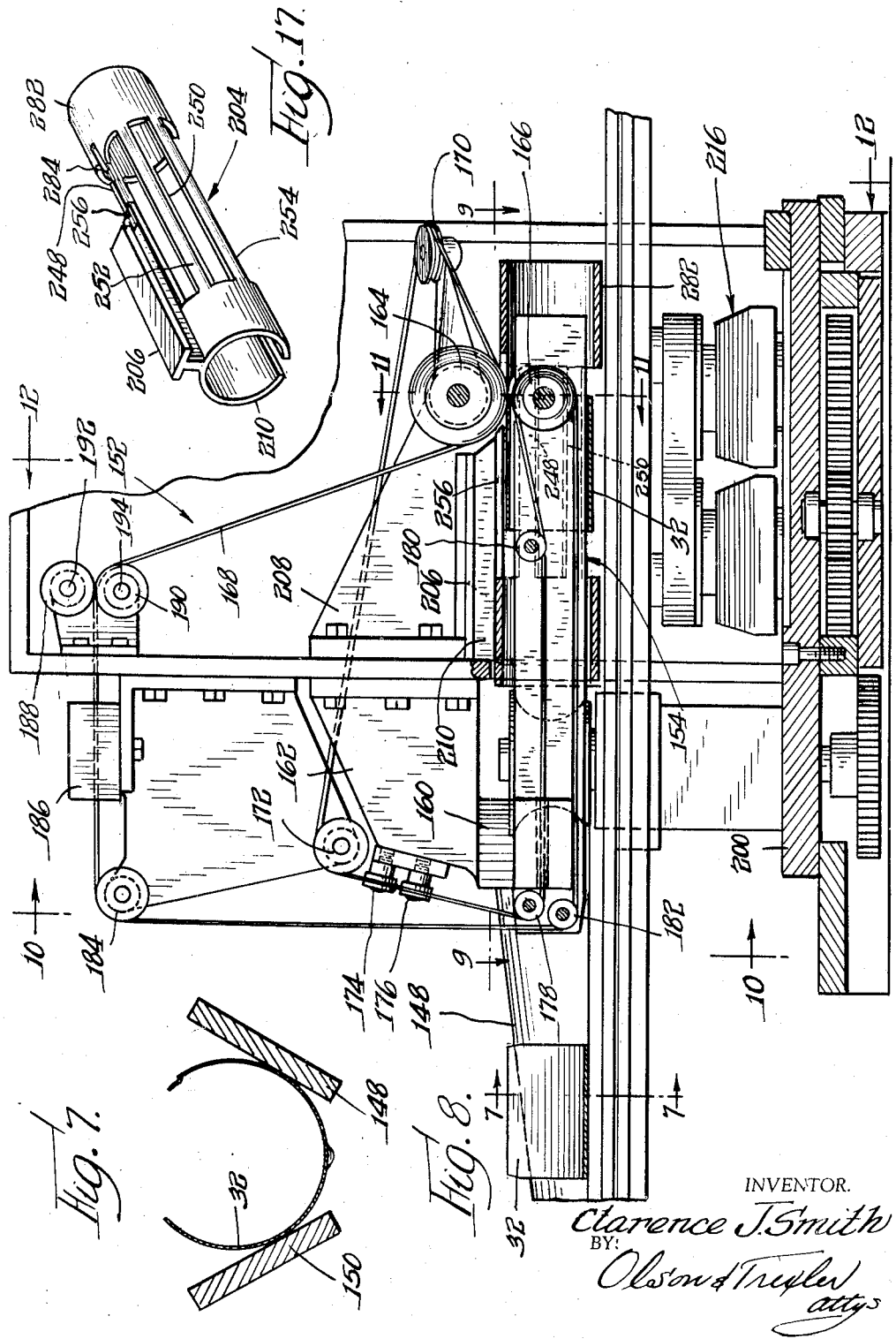

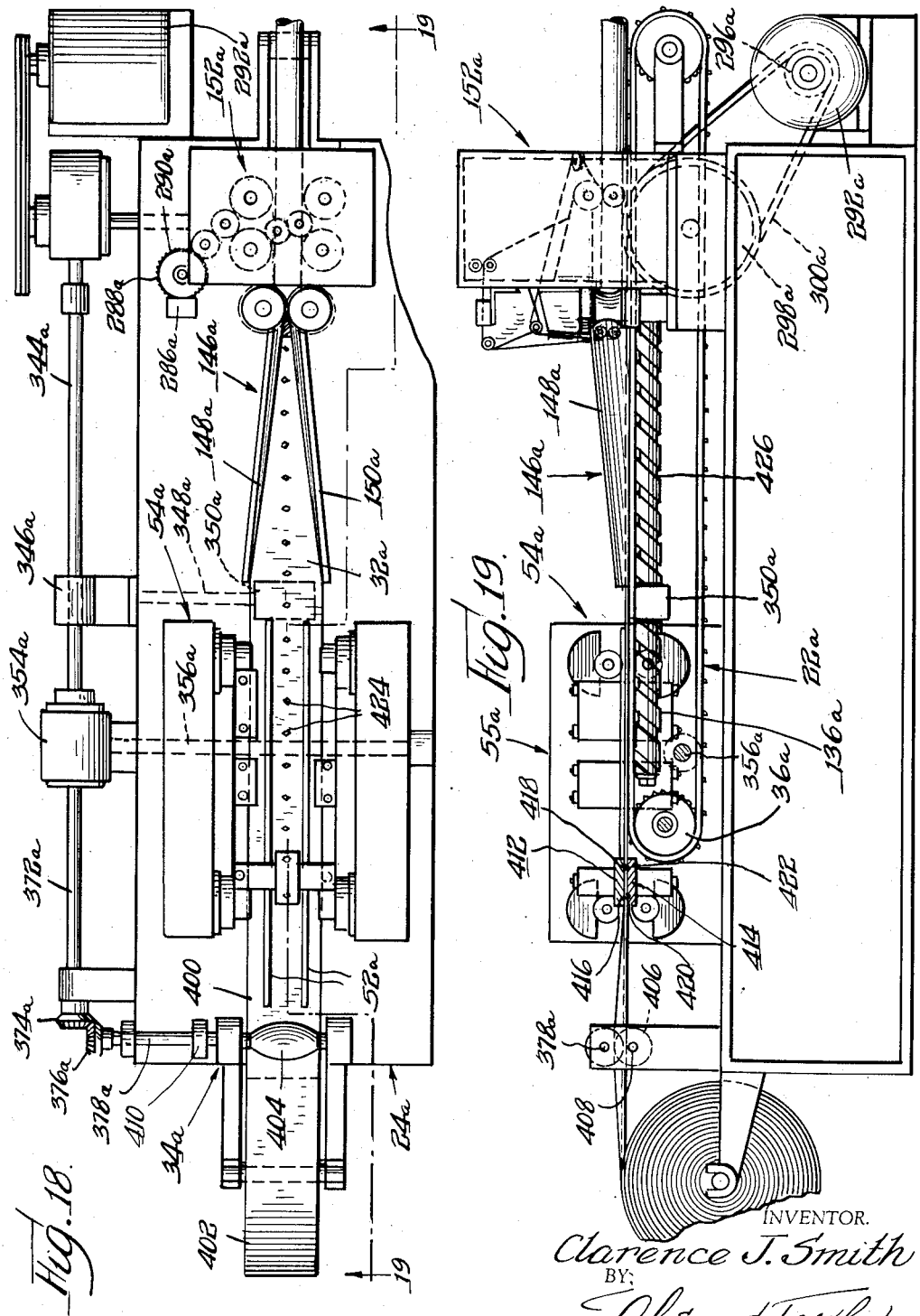

United States Patent Office 2,864,933
Patented Dec. 16, 1958

2,864,933

APPARATUS FOR PRODUCING CAN BODIES AND WELDING SIDE SEAMS THEREOF

Clarence J. Smith, Rockford, Ill., assignor to W. F. and John Barnes Company, Rockford, Ill., a corporation of Illinois Application February 19, 1957, Serial No. 641,210

22 Claims. (Cl. 219—64)

The present invention relates to a novel apparatus for producing can bodies or the like, and more particularly to a novel apparatus for forming can bodies and welding the side seams thereof.

An important object of the present invention is to provide a novel apparatus for successively forming precut blanks into can bodies or the like and welding the side seams thereof while the blanks are moving continuously at a relatively high speed along a predetermined path of travel whereby to promote more economical production of the can bodies.

Another object of the present invention is to provide a novel apparatus for forming can bodies or the like and welding side seams thereof, which apparatus is constructed so that successive blanks moving continuously along a predetermined path of travel are accurately formed and located for the welding operation and the welding operation is controlled so as to insure the provision of a secure and leak-proof weld between opposite terminal ends of each successive can body side seam.

A further object of the present invention is to provide a novel apparatus of the above described type which is capable of forming can bodies from a continuous strip of stock material.

Other objects and advantages of the present invention will become apparent from the following description and the accompanying drawings wherein:

Fig. 1 is a plan view of an apparatus incorporating the features of the present invention;

Fig. 2 is a side elevational view of the novel apparatus;

Fig. 3 is an enlarged partial sectional view taken generally along line 3—3 in Fig. 1;

Fig. 4 is a fragmentary sectional view taken generally along line 4—4 in Fig. 3 and shows the manner in which corners of a can body blank may be diagonally relieved;

Fig. 5 is a fragmentary sectional view taken generally along line 5—5 in Fig. 3 and shows how a margin of a can body blank may be offset for facilitating the formation of a smooth side seam;

Fig. 6 is a cross sectional view taken along line 6—6 in Fig. 3;

Fig. 7 is a cross sectional view taken along line 7—7 in Fig. 8;

Fig. 8 is an enlarged partial sectional view taken generally along line 8—8 in Fig. 1;

Fig. 9 is a sectional view taken generally along the line 9—9 in Fig. 8;

Fig. 10 is a fragmentary cross sectional view taken along line 10—10 in Fig. 8;

Fig. 11 is an enlarged fragmentary cross sectional view taken along line 11—11 in Fig. 8;

Fig. 16 is a fragmentary sectional view taken along line 16—16 in Fig. 11;

Fig. 17 is a perspective view on a reduced scale showing an element of the apparatus;

Fig. 18 is a simplified plan view of the apparatus embodying a modified form of the present invention; and Fig. 19 is a sectional view taken along line 19—19 in Fig. 18.

Figure 12:
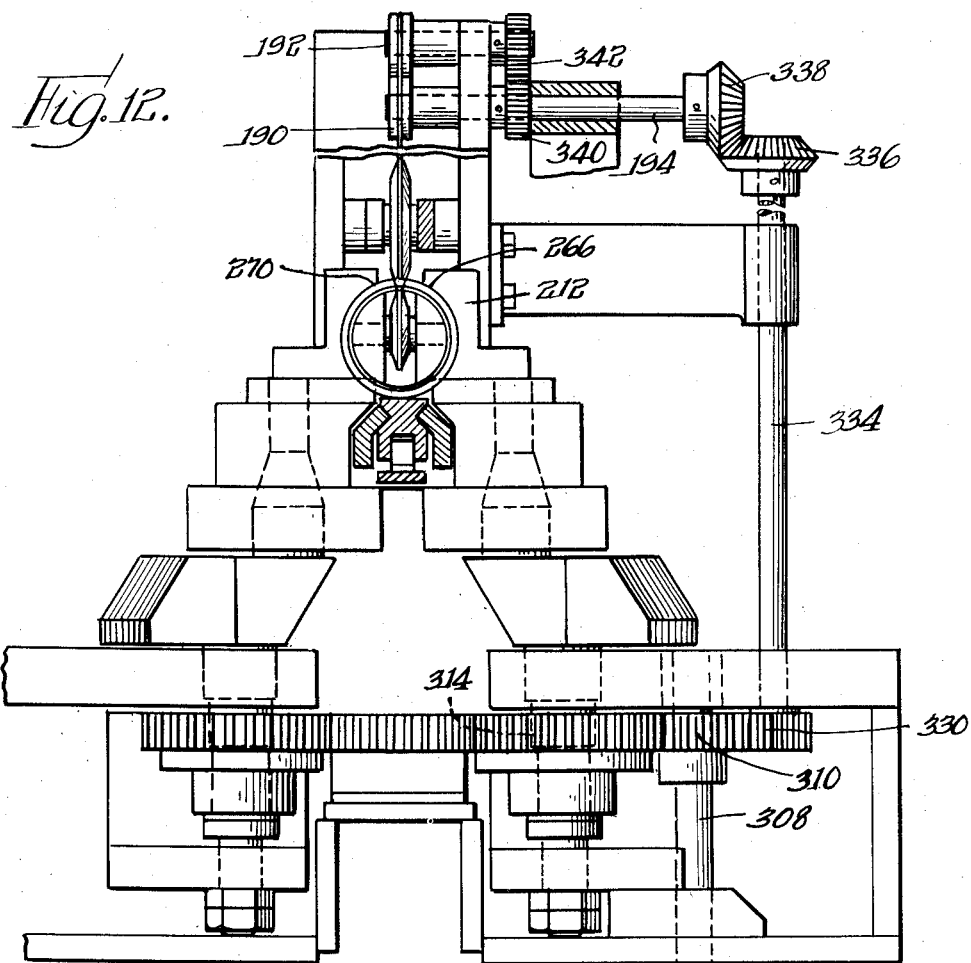
Fig. 12 is a fragmentary partial sectional view taken generally along line 12—12 in Fig. 8.

Referring now more specifically to the drawings wherein like parts are designated by the same numerals throughout the various figures, an apparatus 20 incorporating the features of the present invention as generally shown in Figs. 1 and 2 and comprises conveyor means 22 mounted on and extending longitudinally of a main frame 24 for conveying successive can body blanks along a path of travel past various work stations. A can body blank supply mechanism 26 is mounted adjacent a conveyor loading station 28, which supply mechanism is adapted to support a stack 30 of blanks 32 and feed successive blanks from the bottom of the stack to a flexing mechanism 34. The flexing mechanism is adapted to feed the blanks to the conveyor at the loading station 28. In addition, it is important to note that the flexing mechanism is adapted to flex or curl the blanks sufficiently so that they may be subsequently formed into cylindrical bodies without further substantial cold working of the sheet metal material of the blanks beyond its elastic limits. At the same time, the blanks are flexed or curled only to a condition from which they may be flattened without substantial cold working of the blank material. This enables the blanks to be flattened to facilitate working of side seam margins thereof in the manner described below after which the blanks are allowed to spring back to their flexed condition from which they are subsequently formed into cylindrical bodies. For a more detailed disclosure of the structure and operation of the blank supply and flexing mechanism 26 and 34, reference is hereby made to a copending application Clarence J. Smith et al. Serial No. 641,195, filed February 19, 1957. Reference will also hereinafter be made to this copending application for a detailed disclosure of other portions of the apparatus 20.

As shown in Figs. 2 and 3, the conveyor means 22 includes a pair of rotatably mounted sprocket wheels 36 and 38 and an endless chain 40 encircling the sprocket wheels. Series of blocks 42 and 44 are secured to and spaced along the chain 40, and these blocks respectively carry spring biased dogs 46 and 48 for resiliently gripping trailing and leading edges of blanks 32 placed therebetween at the loading station 28. It is to be noted that as the blocks 42 and 44 pass around the sprocket wheel 36 and approach the loading station, they spread apart so as to permit the insertion therebetween of a blank at the loading station, and as the blocks pass from the sprocket 36 to the upper run of the conveyor chain, they relatively approach each other so that the blank is gripped therebetween. Furthermore, while the blanks are flexed or curled by the mechanism 34 guide rods 50 are provided for maintaining the blanks in a flattened condition as they pass from the flexing mechanism to the loading station, and upper and lower pairs of guide rods 52 extend longitudinally of the conveyor chain for maintaining the blanks in a flattened condition until they have passed a first working station. Reference, is again made to the above mentioned copending application for a more detailed disclosure of the conveyor means and the guide rods and the manner in which the blanks are fed to and gripped by the conveyor means.

At a first working station 54 adjacent the conveyor, means is provided for working opposite side seam margins 56 and 58 of successive blanks as the blanks are continuously moving along with the conveyor as shown in Figs. 4 and 5. At the work station 54 crank assemblies 55 and 57 are disposed at opposite sides of the conveyor and carry tools in a manner so that when the tools engage the workpiece they are moving in the direction of the workpiece path of travel and at substantially the same lineal speed as the workpiece. Referring particularly to Fig. 3, it is seen that the crank assembly 55 comprises a pair of upper crank members 60 and 62 respectively mounted for rotation about axes 64 and 66. Eccentric pins 68 and 70 on the crank members are connected to opposite ends of a cross head member 72 which supports tool holders 74, 76 and 78. The crank assembly also includes a similar lower crank subassembly having crank members 80 and 82 mounted for rotation about axes 84 and 86. A lower cross head member 88 is connected to eccentric pins 90 and 92 of the crank members 80 and 82 and carries tool holders 93, 95 and 97. The oppositely disposed crank assembly 57 also includes similar upper and lower subcrank assemblies having crank members respectively mounted on rotatable shafts 94, 96 and 98, 100 shown in Fig. 2. The upper crank subassembly of the assembly 57 carries tool holders 102 and 104 which correspond to the tool holders 74 and 76 and the lower subassembly carries tool holders, not shown, which correspond to the lower tool holders 94 and 96, but in this embodiment, the subassemblies of the crank assembly 57 do not carry tool holders which correspond to the above described tool holders 78 and 93. It suffices to state here that the crank assemblies are constructed so that the tools carried thereby continuously move in generally elliptical paths. Furthermore, the arrangement is such that when the tools carried by the crank assemblies engage a blank, they are moving in the direction of the path of travel of the blank and at the same lineal speed as the blank. Also, the crank members are counterweighted so that the assemblies are dynamically balanced whereby the apparatus may function at high speeds without undue stress. For a more detailed disclosure of the crank assemblies and the manner in which they function, reference is again made to the above mentioned copending application.

Cooperable pairs of upper and lower dies 106—108 and 110—112 are carried by the tool holders 74—93 and 76—95, and similar cooperable pairs of upper and lower dies 114—116 and 118—120 are carried by the tool holders of the crank assembly 57. As shown in Fig. 4, the cooperable pairs of dies are adapted diagonally to relieve corners of side seam marginal portions 56 and 58 of successive blanks 32. This facilitates flanging of the ends of a subsequently formed can body and attachment to end closures, as will be understood.

Figure 13:
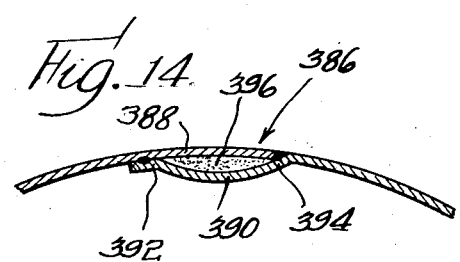
Fig. 13 is an enlarged fragmentary sectional view showing a can body side seam welded in accordance with the present invention.

As shown in Fig. 5, cooperable upper and lower dies 120 and 122 which are respectively carried by the tool holders 78 and 97 are adapted to offset the side seam marginal portion 58 of a blank to provide a recess for receiving the opposite side seam marginal portion 56 when the blank is formed into a cylindrical body so as to provide a side seam 124 having a substantially smooth outer surface as shown in Fig. 13.

In order to insure accurate location of successive blanks with respect to the tools or dies carried by the crank assemblies, means is provided for accurately locating portions of the chain carrying the blanks with respect to the crank assemblies during blank relieving and forming operations. Such means includes a generally U-shaped member 126 shown in Fig. 3 and carried on a member 128 extending between and secured to the opposite lower crank subassemblies. The U-shaped member is adapted to embrace and locate a pair of the conveyor chain pins 130 to obtain a preliminary orientation of the chain with respect to the tools. After a portion of the chain has been preliminarily located with respect to the tools, a bushing 132 carried by a member 134 extending between and secured to the cross heads of the upper crank subassemblies moves into engagement with a pin 133 projecting upwardly from a block 42 for more accurately locating the blanks with respect to the tools. In addition, an elongated roller 136 having a helical cam groove 138 therein is rotatably supported beneath the upper run of the conveyor chain, and rollers 140 on shafts depending from the blocks 42 are adapted to enter the groove 138 so that the blocks 42 are positively located and spaced from each other in accordance with the pitch of the groove 138. It is also to be noted that the roller 136 is positively driven and therefore serves to drive the conveyor chain through the cam follower rollers 140. It is also desirable to insure proper location of the upper and lower dies with respect to each other when they approach each other for engaging the work, and this is accomplished by providing a pin 142 on each of the lower cross head members, which pins are adapted to enter bushings 144 on each of the upper cross head members. Reference is again made to the copending application for a more detailed disclosure of the structure for accurately locating the blanks with respect to the tools and for locating the tools with respect to each other.

The guide rods 52 are terminated at the end of the work station 54 so that the blanks emerging from this work station are permitted to spring back to their preflexed or curled condition as shown in Figs. 1, 2, 3 and 6. Then the blanks are advanced through a work station 146 at which a pair of converging plows 148 and 150 is disposed. The blanks advancing between the plows 148 and 150 are progressively formed from their preflexed condition toward a cylindrical shape as shown in Figs. 1, 2, and 7. However, as mentioned hereinabove, this forming of the blanks is accomplished without cold working of the blank material beyond its elastic limit so that there is no fluting or creasing of the blanks. The blanks are advanced from the work station 146 to a final work station 152 at which they are formed into cylinders and their side seams are welded.

The mechanism at the work station 152 is shown best in Figs. 8–12 and 15–17. This mechanism comprises a central generally cylindrical horn 154 having opposite interconnected side sections 156 and 158 supported only adjacent one end of the horn by a bracket member 160 depending from a frame member 162. An upper roller electrode 164 is suitably supported above the horn, and a lower roller electrode 166 is rotatably mounted between the horn sections 156 and 158 in vertical alignment with the roller 164. The can body blanks are successively formed around the horn 154 in the manner described below so that their side seam marginal portions are disposed in overlapping relationship after which they are passed between the roller electrodes 164 and 166 so that the side seams are welded. It has been found that if the roller electrodes 164 and 166 are engaged directly against the can body blanks which are usually tin plated, the electrodes will pick up particles of the blank metal or tin and soon become so contaminated with such foreign material that any subsequent welding operation will be defective. In order to overcome this problem, a wire 168 of copper or other suitable electrical conductive material is passed around the roller electrodes 164 and 166 so that the wire provides the contact between the electrodes and the can body blanks. The wire is driven so that a fresh increment thereof will be presented to each successive increment of a can body side seam whereby any contaminating material picked up by the wire will not interfere with the welding operation.

As shown best in Fig. 8, the wire electrode 168 is endless and, starting at the upper electrode 164, the wire extends from beneath the upper electrode forwardly around a guide pulley 170 and then rearwardly to guide pulley 172. The pulley 170 is mounted for rotation about an axis inclined with respect to the axis of the roller electrode 164 so that the portion of the wire extending between the pulleys 170 and 172 is offset to prevent interference with other portions of the wire and the apparatus. From the pulley 172 the wire extends under and then over pulleys 174 and 176 respectively so that it is aligned properly with a guide pulley 178 mounted between the sections of the horn. From the pulley 178, the wire extends forwardly beneath a guide pulley 180 rotatably disposed between the sections of the horn and then around the lower roller electrode 166 and rearwardly to another guide pulley 182 mounted at the rear end of the horn beneath the pulley 178. The wire then extends upwardly around a guide pulley 184 mounted on the apparatus frame and then through a die 186 which is adapted to scrape from the wire any contaminating material carried thereby. This enables all portions of the wire to be repeatedly passed over the roller electrodes for engagement with the can body blanks without causing defective welds as a result of contaminating material on the wire. The wire then extends between a pair of feed rollers 188 and 190 respectively mounted on shafts 192 and 194 which are driven so as to pull the wire through the die 186 and also to feed the wire over the roller electrodes at a lineal speed equal to the lineal speed of the can body blanks passing between the electrodes. From the feed rollers, the wire extends back to the upper roller electrode 164.

In order to obtain satisfactory side seams on the can bodies, it is important that the blanks be accurately formed around the central horn and held in a predetermined manner during the welding operation. Thus, the blanks which have their opposite side seam marginal portions spaced apart as they pass onto the rear end of the central horn so as to avoid interference with the horn supporting bracket 160 enter in between a pair of forming rollers 196 and 198 disposed at opposite sides of the central horn. These rollers which are shown best is Figs. 8, 9 and 10 are mounted on shafts 200 and 202 which are driven so that the peripheral speed of the rollers is similar to the lineal rate of advancement of the can body blanks, and these rollers are formed so that each blank will be curled around the central horn without any substantial cold working of the blank material and in a manner which positions the offset side seam marginal portion 58 of the blank beneath the opposite marginal portion 56. An outside horn 204 shown in Figs. 8, 9, 11, 12 and 17 surround the central horn and is mounted by any suitable means such as a bracket 206 secured to a frame member 208. The outside horn has a first tubular section 210 disposed adjacent the rollers 196 and 198 so that the leading end of each can body blank will enter the tubular section 210 before the center of the blank passes a plane including the axis of both of the rollers 196 and 198. Thus, the leading end of each blank will be confined by the horn portion 210 before it has a chance to spread apart after passing the rollers 196 and 198.

The internal diameter of the outside horn is sufficiently greater than the diameter of the central horn so as to prevent the blanks from being squeezed between the two horns and thereby minimize frictional resistance to the advancement of the blanks and any possibility of injury to the blanks. This arrangement, however, maintains the side seam marginal portions 56 and 58 of the blanks only in partially overlapping relationship so that these marginal portions must be shifted into fully overlapping relationship prior to the starting of the welding operation. Furthermore, there is a possibility that at least some of the blanks may become slightly twisted so that their side seam marginal portions 56 and 58 are axially offset slightly from each other as the blanks pass through the outside horn portion 210 so that the side seam marginal portions must be relatively axially shifted to bring them into proper alignment prior to the start of the welding operation. Such proper forming of the can bodies and alignment of their side seam marginal portions is accomplished by a pair of forming members 212 and 214 which are shown best in Figs. 9, 11 and 12 and which are mounted for movement into and out of engagement with a can body blank and also for movement in the direction of the path of travel of the can body blank and at substantially the same lineal speed as the can body blank when they are in engagement with a can body blank. More specifically, the forming and locating members 212 and 214 are respectively carried by crank assemblies 216 and 218 which are similar to the crank subassemblies described above except that they are mounted for movement in a horizontal plane. Thus, the crank assembly 216 includes a pair of crank members 220 and 222 respectively mounted on rotatable shafts 224 and 226 and having eccentric pins or stub shafts 228 and 230. A cross head member 232 is mounted on the eccentric pins and carries the forming and locating member 212. The crank assembly 218 similarly includes a pair of crank members 234 and 236 mounted on rotatable shafts 238 and 240. Eccentric pins 242 and 244 of these crank members support a cross head member 246 on which is mounted the forming and locating member 214. These crank assemblies, like the ones described above are dynamically balanced so that they may be operated at high speeds without creating undue stresses.

In order to maintain the side seam portions of the blanks in overlapping relationship as they advance from the outer horn portion 210 toward the electrodes and at the same time provide clearance which will permit the members 212 and 214 to engage the blanks, an intermediate section of the outside horn comprises pairs of opposite side guide bars or rods 248—250 and 252—254 which will confine opposite sides of the can body blanks, and an upper centrally located guide rod or bar 256 which extends to a point adjacent the upper roller electrode 164 and will confine the side seam portions of the blanks. In addition, the members 212 and 214 are respectively provided with pairs of longitudinally extending slots 258—260 and 262—264 in their can blank engaging surfaces for accommodating the side guide bars when the members 212 and 214 are advanced into engagement with a can body blank.

Figure 15:
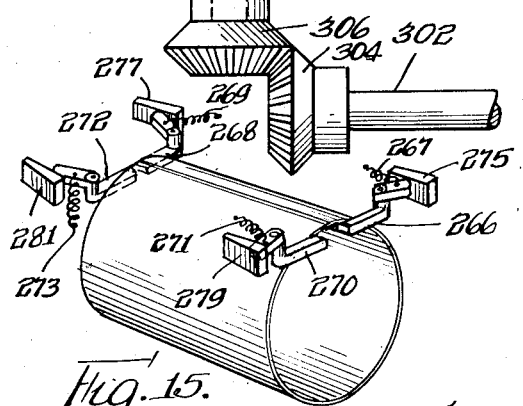
Fig. 15 is a fragmentary perspective view of a mechanism for squaring ends of can body blanks prior to welding of the side seams thereof.

As shown in Figs. 11, 12, 15 and 16, locating bell cranks 266 and 268 are pivotally mounted at opposite ends of the member 212 so that their inner end finger portions project inwardly from adjacent the upper margin of the can engageable surface of the member 212, and similar pivoted bell cranks 270 and 272 are provided on the member 214. Springs 267 and 269 are provided for normally spreading apart the inner end fingers of the bell cranks 266 and 268, and the inner finger portions of the bell cranks 270 and 272 are similarly normally spread apart by springs 271 and 273, as shown in Fig. 16. Fixed cam members 275—277 and 279—281 are mounted for engaging outer end portions of the bell cranks 266—268 and 270—272 respectively and shifting the bell cranks so that their inner fingers move toward each other for engaging a blank as shown in Fig. 15. The fingers are adapted to engage opposite endmost edges of a can body blank so as to square the ends of the blank with respect to its longitudinal axis and insure proper alignment of the side seam marginal portions of the blank when the members 212 and 214 move toward engagement with the blank so as to move the bell cranks into engagement with their associated cams. More specifically, in the event a blank is slightly twisted so that its opposite side seam margins are axially offset from each other, the fingers will engage the end edges of the blank as the members 212 and 214 are moved toward engagement with the blank, and the fingers, upon being actuated by the cams, will cause the blank to be untwisted and its end edges will be positively located by the fingers. Notches 278 and 280 are provided in the central horn so to prevent interference between the horn and the locating fingers.

It is to be noted that the members 212 and 214 are driven in timed relationship with the conveyor chain and are located with respect to the roller electrodes so that they fully engage and properly form and locate each can body blank when leading terminal ends of the blank side seam marginal portions come into contact with the wire passing around the roller electrodes 164 and 166. At this instant, the welding apparatus is energized in the manner described below so that a weld if formed at the leading terminal ends of the can body side seam portions, after this initial weld has been formed, the members 212 and 214 are withdrawn from the can body blank as they continued to move along their generally elliptical paths of travel. However, the initial weld locks the side seam portions to hold them in the desired relationship, and in addition the leading end of the can body enters another tubular portion 282 of the outside horn so that assurance is provided that the side seam portions will not pull apart during the remainder of the welding operation. As shown best in Figs. 9 and 17, the outside horn portion 282 has a slotted section 284 which projects partially around the upper roller electrode so that it will engage the end of a can body as the members 212 and 214 are disengaged from the can body without interfering with the members 212 and 214.

Welding of each side seam is accomplished by energizing the welding apparatus so as to provide a series of spot welds along the side seam. It has been found, for example, that a secure and leak-proof side seam is obtained when about seven spot welds per inch are substantially uniformly spaced along the side seam. It is important, however, that opposite endmost welds be located substantially at the opposite ends of the side seam. Thus the electrical circuit, not shown, of the welding apparatus is controlled so that it is operated in timed relationship with the movement of the can blanks and the movement of the blank forming and locating members 212 and 214. More specifically, a switch 286 which is shown in Fig. 1 is provided for controlling the welding circuit, and a rotatable disk 288 is provided for actuating the switch. The disk which is shown in simplified form is provided with peripherally spaced groups of teeth 290 which project for actuating the switch 286. The teeth in each group are spaced from each other so that the switch is operated to obtain the desired number of spot welds per inch on a can body side seam. Furthermore, the disk 288 is driven in timed relationship with the conveyor and the members 212 and 214 so that the first spot weld is formed at the leading edge of the side seam when the can body blank is properly held between the members 212 and 214 and so that the last spot weld will be formed at the trailing edge of the side seam.

The means for driving the various elements of the apparatus in timed relationship is generally shown in Figs. 1 and 2 and partially shown in Fig. 12. This means includes an electric motor 292 which drives an input shaft 294 of a transmission through pulleys 296 and 298 and a drive belt or chain 300. An output shaft 302 of this transmission extends beneath the mechanism at the welding station and has a bevel gear 304 secured thereto which meshes with and drives a complementary bevel gear 306 on an upstanding shaft 308 which is suitably rotatably supported. A pinion 310 secured to the upper end of the shaft 308 meshes with the drive gears 312 and 314 on the shafts of the crank members 220 and 222. Idler gears 316 and 318 are driven from the gear 312 and serve to drive gears 320 and 322 on shafts of the cranks 234 and 236. Another idler gear 324 is driven from the gear 312 and serves to drive a gear 326 on the shaft of the forming roller 196, which gear in turn drives a gear 328 on the shaft of the forming roller 198. Still another idler gear 330 is driven from the gear 310 and serves to drive a gear 332 on the shaft of the timing disk 288. A shaft 334 on which the gear 330 is secured extends upwardly and has a bevel gear 336 secured to its upper end which meshes with a bevel gear 338 fixed on an extension of the shaft 194 for driving the electrode wire feed roller 190. The shaft 192 of the wire feeding roller 188 is driven from the shaft 194 through gears 340 and 342.

A second output shaft 344 from the transmission extends to a second transmission 346 which has a lateral output shaft 348. The shaft 348 serves to drive the roller 136 having the helical groove therein through a gear box 350 and thus serves to drive the conveyor. Another shaft 352 extends from the transmission 346 to a transmission 354 which has an output shaft 356 extending laterally for driving the crank assemblies 55 and 57. As shown in Fig. 2, a gear 358 on the shaft 356 meshes with a gear 360 on the shaft of a crank member of a lower crank subassembly, which gear 360 in turn drives a gear 362 on the shaft of one of the upper crank members. Idler gears 364 and 366 are driven from the gear 358 and serve to drive a gear 368 on the shaft of another of the lower crank members. The gear 368 also serves to drive a gear 370 on a shaft of one of the upper crank members. Another shaft 372 extends from the transmission 354 and has a bevel gear 374 on an end thereof which meshes with a bevel gear 376 on a transverse shaft 378. A second bevel gear 380 on the shaft 378 meshes with a gear 382 for driving the blank flexing or curling mechanism 34. The blank feeding mechanism 26 is driven from the flexing mechanism 34 through suitable gear means. For a more detailed disclosure of the manner in which the crank assemblies 55 and 57 and the feeding and flexing mechanism 26 and 34 are driven, reference is again made to above mentioned copending application.

Figure 14:
Fig. 14 is a fragmentary sectional view showing a modified can body side seam.

In Fig. 13 a portion of a can body having a side seam 124 produced by the apparatus described above is shown. In this structure, the side seam portions 56 and 58 are substantially fully overlapped and are secured together by a centrally located longitudinally extending series of spot welds 384. Fig. 14 shows a portion of a can body having a modified side seam 386 which may be produced with a slightly modified form of the apparatus described above. In this side seam, the marginal portions 388 and 390 of the blank are overlapped and secured together by spaced series of spot welds 392 and 394. In addition, the marginal portion 390 is formed so that is is dished in transverse cross section to provide a spaced for accommodating a strip of sealing compound 396. The apparatus for producing this side seam structure is essentially the same as that described above except that the dies 120 and 122 are modified to produce the dished shape side seam portion 390, and pairs of upper and lower roller electrodes and electrode wires are disposed in side-by-side relationship for producing the spaced series and spot welds 392 and 394. In addition, a mechanism, not shown, will be provided adjacent the conveyor for applying the sealing compound 396 to the marginal portion 390 of a blank after the marginal portion has been formed, which sealing compound applying mechanism might, for example, be similar to the flux applying means disclosed in my above mentioned copending application.

Referring now to Figs. 18 and 19, there is shown a modified embodiment of the present invention which is similar to the above described structure as indicated by the application of identical reference numerals with the suffix $a$ added to corresponding elements. This embodiment differs in that it is modified so that it is adapted to accommodate successive can body blanks in the form of an elongated continuous strip of sheet material, which strip is designated by the numeral 400. The strip 400 is fed into the apparatus from a supply roll 402 rotatably supported adjacent the end of the main machine frame 24a. The strip advances first through the preflexing mechanism 34a which in this embodiment comprises a rounded convex upper roller 404 and a complementary concave lower roller 406 respectively fixed on driven shafts 378a and 408. The shaft 408 is driven from the shaft 378a through gear means 410 indicated in Fig. 18. Reference is made to the above mentioned copending application for a more detailed disclosure relative to this preflexing means.

The strip advances from the preflexing means 34a beneath the guide bars 52a and through the work station 54a. The crank assembly mechanism at the station 54a is similar to that described above except that it is elongated and it is disposed so that it extends rearwardly of the conveyor sprocket wheel 36a. The tools carried by the crank assemblies at the work station 54a are similar to those described above except that they are modified for relieving corners and offsetting the marginal portions of a plurality of adjacent can body blank sections of the strip at one time. The arrangement of the tools and the manner in which they are operated is similar to that described in the above mentioned copending application except, of course, that the tools are shaped so as merely to relieve the corners of the blanks. With this arrangement of the tools it is to be noted that the driving means of this embodiment is constructed so that the conveyor advances the strip 400 a distance equal to the combined length of two of the blank sections during each revolution of the crank assemblies at the work station 54a.

In addition to the tools mentioned above, tool holders 412 and 414 are carried by and extend between the upper and lower crank assemblies respectively and in turn support a pair of punches 416—418 and a pair of cooperable dies 420 and 422 which are adapted to punch small preferably diamond shaped apertures 424 in the strip. These apertures are located so that they are bisected by lines along which the strip will eventually be cut when it is separated into individual can bodies, and the apertures are sufficiently small so that the notches provided thereby in the ends of finished can bodies are similar to the relieved corners of the blanks and therefore will not interfere with satisfactory application of end closures to the can bodies. In this embodiment, the conveyor is modified in that the can blank gripping means described above is replaced by a series of pins preferably having a diamond shape cross section and adapted to enter the apertures 424 so that the conveyor will positively engage, locate and feed successive can body blank sections of the strip. This modified structure of the conveyor is shown in more detail in the above mentioned copending application.

The strip emerging from the work station 54a passes between the plows 148a and 150a and then through the welding station at which the mechanism is substantially identical to the corresponding mechanism described above. However, the drive means for the crank assemblies at the welding station is modified so that the forming members corresponding to the above described members 212 and 214 make one complete revolution around their paths of travel during the advancement of each successive can body blank section or increment of the strip, and the timing disk 288a for the welding circuit is modified so as to accommodate the short spaces provided by the relieved corners of successive blank sections rather than the long spaces between separate blanks in the apparatus described above. In addition, the above described blank squaring bell cranks or fingers are eliminated from the forming members. As the strip emerges from the welding station, it is in the form of a continuous tube having a welded side seam which is interrupted only by the notches provided by the relieved corners of successive can body sections. The tube is then directed from the end of the conveyor to a mechanism, not shown, which separates successive can body sections from the tube. Preferably, in this embodiment, a roller 426 having a worm slot therein substantially identical to the above described roller 136 is driven by and extends forwardly from the gear box 350a to the welding station so that positive control of the conveyor chain and thus successive blank sections of the strip is maintained substantially throughout the apparatus. This additional worm roller may also advantageously be used in the above described embodiment of the invention which processes precut separate blanks.

While the preferred embodiments of the present invention have been shown and described herein, it is obvious that many structural details may be changed without departing from the spirit and scope of the appended claims. Where the terms "blank," "blanks," "successive blanks" and the like are used in the claims, they are intended to cover blanks which are either separated or are integrally joined in a continuous strip except in claims wherein the blanks are specifically defined as being separated or in a continuous strip.

The invention is claimed as follows:

1. An apparatus for forming can bodies or the like from successive blanks and for welding side seams of the can bodies, comprising means for continuously advancing successive blanks along a predetermined path of travel, means adjacent said path of travel and continuously movable around elongated endless path means successively toward, along and away from said path of travel for engaging successive continuously moving blanks and positioning side seam marginal portions of each blank in predetermined juxtaposed relationship, and means disposed adjacent said path of travel for welding the side seam marginal portions of successive blanks when said side seam marginal portions are held in juxtaposed relationship.

2. An apparatus, as defined in claim 1, wherein said blank advancing means is adapted for conveying separate blanks, and said means for positioning side seam marginal portions of the blanks includes means engageable with leading and trailing edges of successive separate blanks for squaring ends of the blanks with respect to a longitudinal axis of the can body to be formed.

3. An apparatus for forming can bodies or the like from successive blanks and for welding side seams of can bodies, comprising means for continuously advancing successive blanks along a predetermined path of travel, means adjacent said path of travel and continuously movable around elongated endless path means successively toward, along and away from said path of travel for engaging successive continuously moving blanks and positioning side seam marginal portions of each blank in predetermined juxtaposed relationship, and means disposed adjacent said path of travel for welding the side seam marginal portions of successive blanks when said side seam marginal portions are held in said juxtaposed relationship and for starting the welding of each successive juxtaposed side seam marginal portion at their leading terminal ends.

4. An apparatus, as defined in claim 3, wherein said welding means functions to provide a series of spot welds along juxtaposed side seam marginal portions and locates a last spot weld at trailing terminal ends of the juxtaposed side seam marginal portions.

5. An apparatus for forming can bodies or the like from successive blanks and for welding side seams of the can bodies, comprising means for continuously advancing successive blanks along a predetermined path of travel, means adjacent said path of travel and movable around elongated endless path means for engaging successive continuously moving blanks and positioning side seam marginal portions of each blank in predetermined juxtaposed relationship, means disposed adjacent said path of travel for welding the side seam marginal portions of successive blanks when the side seam marginal portions are held in said juxtaposed relationship, and means controlling said welding means for providing a series of spot welds along the juxtaposed side seam marginal portions of successive blanks with a pair of such spot welds accurately located at opposite terminal ends of the juxtaposed side seam marginal portions, said last mentioned means including switch means for controlling said welding means, and a member driven in timed relationship with the means for advancing the can body blanks and comprising a series of projections for engaging and actuating said switch means.

6. An apparatus for forming can bodies or the like from successive blanks and for welding side seams of the can bodies, comprising means for continuously advancing successive blanks along a predetermined path of travel, means including a pair of crank assemblies and members carried thereby and movable continuously around generally elliptical paths of travel at opposite sides of said first mentioned path of travel for engaging successive continuously moving blanks and positioning side seam marginal portions of each blank in predetermined juxtaposed relationship, and means disposed adjacent said path of travel for welding the side seam marginal portions of successive blanks when the side seam marginal portions are held in juxtaposed relationship by said members.

7. An apparatus for forming can bodies or the like from successive blanks and for welding side seams of the can bodies, comprising means for continuously advancing successive blanks along a predetermined path of travel, means including a pair of members at opposite sides of said path of travel and continuously movable around elongated endless path means successively toward, along and away from said path of travel for engaging successive continuously moving blanks and positioning side seam marginal portions of each blank in predetermined juxtaposed relationship, and means for welding such juxtaposed side seam marginal portions including a pair of peripherally opposed roller electrodes respectively rotatably mounted within and without the path of travel of the juxtaposed side seam marginal portions, electrode wire means having sections passing over opposed peripheral portions of said roller electrodes for engaging the juxtaposed side seam marginal portions, means for feeding said wire means in timed relationship with said continuously advancing blanks, and means for removing substantially any contaminating material picked up by said wire means form said blanks.

8. An apparatus, as defined in claim 7, wherein said electrode wire means is endless.

9. An apparatus for forming can bodies or the like from successive blanks and for welding side seams of the can bodies, comprising means for continuously advancing successive blanks along a predetermined path of travel, outside generally tubular horn means surrounding a portion of said path of travel for receiving successive blanks and preliminarily positioning side seam marginal portions of each blank with respect to each other, means adjacent said path of travel for projecting through openings in said horn means for engaging successive continuously moving blanks and finally accurately positioning side seam marginal portions of each blank in predetermined juxtaposed relationship, and means disposed adjacent said path of travel for welding the side seam marginal portions of successive blanks when the side seam marginal portions are held in said juxtaposed relationship.

10. An apparatus for forming can bodies or the like from successive blanks and for welding side seams of the can bodies, comprising means for continuously advancing successive blanks along a predetermined path of travel, means adjacent said path of travel and continuously movable around elongated endless path means successively toward, along and away from said path of travel for engaging successive continuously moving blanks and positioning side seam marginal portions of each blank in predetermined juxtaposed relationship, means disposed adjacent said path of travel for engaging side seam marginal portions of successive blanks initially when the side seam marginal portions are held in juxtaposed relationship by said positioning means and for subsequently welding the juxtaposed side seam marginal portions throughout their length as the blanks continue to advance, and outside horn means surrounding said path of travel immediately downstream from said welding means for receiving and confining successive blanks during welding thereof.

11. An apparatus for forming can bodies or the like from successive blanks and for welding side seams of such can bodies, comprising means for continuously advancing successive blanks along a predetermined path of travel, means adjacent said path of travel and continuously movable around generally elliptical paths of travel at opposite sides of said first mentioned path of travel successively toward, along and away from said first mentioned path of travel for engaging successive continuously moving blanks and positioning side seam marginal portions of each blank in predetermined juxtaposed relationship, means adjacent said path of travel in advance of said positioning means for initially locating side seam marginal portions of successive blanks in adjacent relationship, outside horn means extending between said initial locating means and said positioning means and extending downstream from said positioning means along said first mentioned path of travel for initially retaining the side seam marginal portions of successive blanks in said initial adjacent relationship and for subsequently retaining the side seam marginal portions of successive blanks in said juxtaposed relationship, and means disposed adjacent said path of travel for welding side seam marginal portions of successive blanks and for initiating such welding when the side seam marginal portions are held in said juxtaposed relationship by said first mentioned positioning means.

12. An apparatus for forming can bodies or the like from successive blanks and for welding side seams of the can bodies, comprising means for preflexing successive blanks sufficiently to enable the blanks to be subsequently formed into substantially cylindrical bodies without further substantial cold working of the blank material, means adjacent said preflexing means for continuously advancing the preflexed blanks successively along a predetermined path of travel, means adjacent said path of travel for forming successive blanks generally into cylinders without substantial cold working of the blank material and for locating side seam marginal portions of successive blanks in adjacent relationship, means adjacent said path of travel and continuously movable around elongated endless path means successively toward, along and away from said path of travel for engaging successive generally cylindrical blanks continuously moving along said path of travel and positioning said side seam marginal portion of each blank in predetermined juxtaposed relationship, and means disposed adjacent said path of travel for welding the juxtaposed side seam marginal portions of successive blanks.

13. An apparatus for forming can bodies or the like from successive blanks and for welding side seams of the can bodies, comprising means for continuously advancing successive blanks along a predetermined path of travel, a pair of opposing crank assemblies carrying cooperable tools adjacent said path of travel and continuously moving said tools around generally elliptical paths of travel into and out of engagement with a side seam marginal portion of successive blanks for offsetting such side seam marginal portions, means adjacent said path of travel and including opposed members at opposite sides of said path of travel continuously movable around elongated endless path means successively toward, along and away from said path of travel for subsequently engaging successive continuously moving blanks and positioning side seam marginal portions of each blank in predetermined overlapping relationship, and means disposed adjacent said path of travel for welding the overlapping side seam marginal portions of successive blanks.

14. An apparatus for forming can bodies or the like from successive blanks and for welding side seams of the can bodies, comprising means for continuously advancing successive blanks along a predetermined path of travel, a pair of opposing crank assemblies disposed adjacent said path of travel and carrying cooperable tools and moving said tools around generally elliptical paths of travel for engaging successive blanks and relieving corners of such blanks, means adjacent said first mentioned path of travel and continuously movable around elongated endless path means successively toward, along and away from said first mentioned path of travel for subsequently engaging successive continuously moving blanks and positioning side seam marginal portions of each blank in predetermined overlapping relationship, and means disposed adjacent said first mentioned path of travel for welding the overlapping side seam marginal portions of successive blanks.

15. In an apparatus for forming can bodies and welding side seams thereof, the combination comprising means for continuously advancing successive blanks along a predetermined path of travel, and means adjacent said path of travel including a pair of oppositely disposed members continuously movable around elongated endless path means successively toward, along and away from said path of travel for engaging successive continuously moving blanks and positioning side seam marginal portions of each blank in predetermined juxtaposed relationship for welding.

16. A combination, as defined in claim 15, which includes means adjacent said path of travel in advance of said members for engaging successive blanks and initially locating side seam marginal portions of each blank in adjacent relationship, and outside horn means extending between said initial locating means and said members and extending downstream of said path of travel from said members for initially retaining the side seam, marginal portions of each blank in said adjacent relationship and for subsequently retaining the side seam marginal portions of each blank in said juxtaposed relationship.

17. An apparatus, as defined in claim 1, wherein said successive blanks are integrally joined in the form of a continuous strip, and wherein said means for continuously advancing successive blanks includes an endless series of projection means adapted to extend into openings spaced along said strip for positively engaging and feeding the strip, said apparatus including means disposed in advance of said endless series of projection means for forming said openings in the strip.

18. An apparatus, as defined in claim 2, wherein said means engageable with the leading and trailing edges of the blanks includes a pair of pivotal finger members having end portions movable toward and away from each other and into and out of said path of travel respectively for engaging leading and trailing edges of successive blanks.

19. An apparatus for forming can bodies or the like from successive blanks and for welding side seams of the can bodies, comprising means for continuously advancing spaced successive blanks along a predetermined path of travel, a pair of members movable around generally elliptical paths of travel at opposite sides of said first mentioned path of travel for engaging successive continuously moving blanks and positioning side seam marginal portions of each blank in juxtaposed relationship, a pair of shiftable finger elements mounted on at least one of said members in spaced relationship and shiftable relatively toward and away from each other and into and out of said first mentioned path of travel for engaging respectively leading and trailing edges of successive blanks for squaring ends of the blanks with respect to a longitudinal axis of the can body to be formed, cam means disposed for actuating said finger elements relative toward each other and into engagement with leading and trailing edges of a blank when said members moving around said elliptical paths of travel move substantially into engagement with said blank, and means disposed adjacent said path of travel for welding the side seam marginal portions of successive blanks when the side seam marginal portions are held in juxtaposed relationship and the ends of the blanks are squared.

20. In a method of producing can bodies, the combination of steps comprising continuously advancing a continuous strip of sheet material along a predetermined path of travel, forming a longitudinally extending series of apertures in the strip with the apertures respectively located on imaginary lines between successive can body blank sections of the strip, then continuously positively engaging and locating margins of said apertures through blank sections moving along a portion of said path of travel and thereby positively locating said last mentioned blank sections, then forming successive blank sections into a tubular shape and forming a series of substantially equally spaced spot welds on and joining side seam marginal portions of successive blank sections moving along said path of travel portion, and controlling the formation of the spot welds accurately to locate spot welds at leading and trailing terminal ends of side seam marginal portions of each successive blank section.

21. In a method of producing can bodies, the combination of steps comprising continuously advancing a continuous strip of sheet material along a predetermined path of travel, forming a longitudinally extending series of apertures in the strip with the apertures respectively located on imaginary lines between successive can body blank sections of the strip, then continuously positively engaging and locating margins of said apertures through blank sections moving along a portion of said path of travel and thereby positively locating said last mentioned blank sections, then forming successive blank sections into a tubular shape and welding side seam marginal portions thereof together while the blank sections are moving along said path of travel portion.

22. In a method of producing can bodies, the combination of steps comprising continuously advancing a continuous strip of sheet metal along a predetermined path of travel, forming a longitudinally extending series of apertures in the strip with the apertures respectively located on imaginary lines between successive can body blank sections of the strip, then continuously positively engaging and locating margins of said apertures through blank sections moving along a portion of said path of travel and thereby positively locating said last mentioned blank sections, then forming successive blank sections moving along said path of travel portion to locate opposite side seam marginal portions thereof adjacent each other, then successively engaging opposite outer sides of blank sections moving along said path of travel portion and holding said sides to locate side seam marginal portions of each successive blank in abutting parallel relationship and substantially simultaneously forming a spot weld joining the abutting and parallel side seam marginal portions, then successively forming on each advancing blank section moving along said path of travel portion a series of substantially equally spaced spot welds joining side seam marginal portions of the successive blank sections, and controlling the formation of said spot welds accurately to locate spot welds at leading and trailing terminal ends of side seam marginal portions of each successive blank section.

References Cited in the file of this patent

UNITED STATES PATENTS

| | | |
|---|---|---|
| 1,300,603 | Gravell | Apr. 15, 1919 |
| 2,204,549 | Murch | June 18, 1940 |
| 2,444,465 | Peters | July 6, 1948 |
| 2,578,832 | Pearson et al. | Dec. 18, 1951 |
| 2,772,768 | Hogan | Dec. 4, 1956 |